United States Patent [19]

Bybee et al.

[11] 4,426,352

[45] Jan. 17, 1984

[54] COMPOSITE DETECTOR

[75] Inventors: Richard T. Bybee; Arnold E. Paulson; Holland D. Warren, all of Lynchburg, Va.

[73] Assignee: The Babcock & Wilcox Company, New Orleans, La.

[21] Appl. No.: 207,049

[22] Filed: Nov. 14, 1980

[51] Int. Cl.³ .................................. G21C 17/00
[52] U.S. Cl. ....................................... 376/255
[58] Field of Search .............. 376/153, 154, 254, 255

[56] References Cited

U.S. PATENT DOCUMENTS

| 3,400,289 | 9/1968 | Anderson | 376/255 |
| 3,760,183 | 9/1973 | Neissel | 376/154 |
| 3,769,156 | 10/1973 | Brecy | 376/255 |
| 3,827,935 | 8/1974 | Gruner et al. | 376/255 |
| 4,172,012 | 10/1979 | Paziaud | 376/154 |
| 4,268,354 | 5/1981 | Wassel et al. | 376/254 |
| 4,288,291 | 9/1981 | Cisco et al. | 376/153 |

FOREIGN PATENT DOCUMENTS 902273 6/1972 Canada .................. 376/255

OTHER PUBLICATIONS

"Self-Powered Neutron Detectors", *Nuc. Eng. Int.* (5/72), p. 399.

"In Core Flux Detectors", *Nuc. Eng. Int.* (8/70) Goodings, p. 599.

"Incore Monitoring System", *Basic Training Manual Babcock*–205, NSR–111, B & W Co. (10/75), Chapter 5, Section 6.

Nuc. Eng. Int. (8/70), p. 604, Schallop, "In Core Instrumentation", Nuc. Inst. & Meth., 125 (1975), pp. 327–329, Bock.

Proc. 1977 Joint Auto. Control. Conf. San Francisco (6/20/77), Khanna et al., pp. 375–380.

Fast Reactor Technology: Plant Design, Yevick Ed. 1966, M.I.T. Press, p. 580.

Proc. 1977 Joint Control Conf., San Francisco (6/20/77), Haebler, pp. 305–309.

Nuc. Inst. & Meth. 123 (1975), 117–123, Bock.

At. Eng. Rev. 14, No. 1, pp. 87–132 (1976) Bock.

*Primary Examiner*—Sal Cangialosi
*Attorney, Agent, or Firm*—Robert J. Edwards; Robert H. Kelly; James C. Simmons

[57] ABSTRACT

An incore neutron flux detector assembly is provided, having a plurality of juxtapositioned pairs of prompt responding detectors and delayed responding neutron detectors spaced axially along the active fuel height of a core. The more accurate delayed response detectors are utilized to provide a generally continuous calibration of the less accurate prompt responding detectors for the flux distribution at the axial position.

4 Claims, 6 Drawing Figures

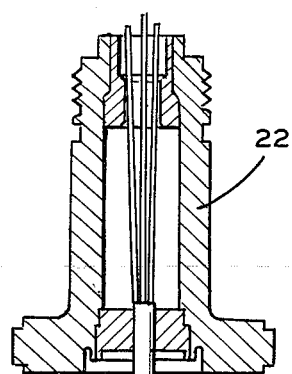
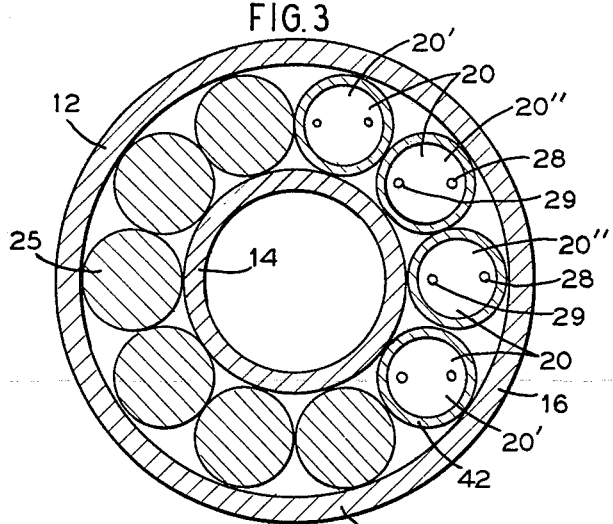
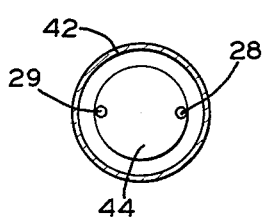
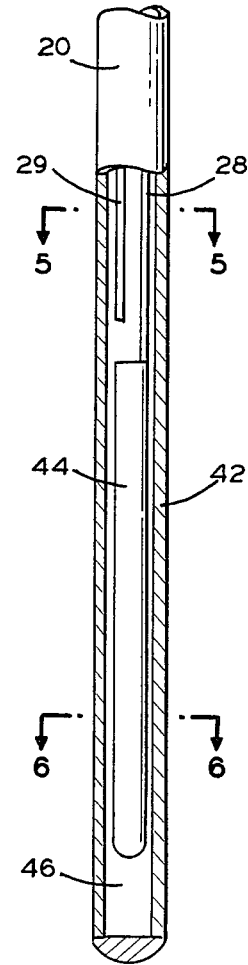
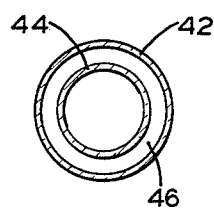
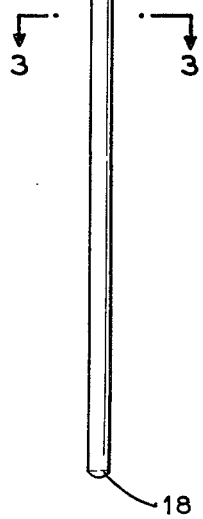

COMPOSITE DETECTOR

TECHNICAL FIELD

This invention relates to incore sensors or selfpowered neutron detectors (SPND's) used to detect neutron flux inside the core of a nuclear reactor, and in particular to assemblies that have paired prompt-responding and delayed-response detectors.

BACKGROUND OF PRIOR ART

A critical measurement in the operation of nuclear reactors is that of in-core flux density. Neutron detectors responsive to neutron flux changes are well known and broadly classified into two categories as "prompt-responding" and "delayed-response" types. The prompt detector instantaneously respond to neutron flux changes while the detector signal of the delayed detector reaches equilibrium at a significantly measureable time following termination of the neutron flux change. The delayed-response detector, which are more accurate than the prompt responding types, are used to provide a history of power distributions and variations during power operation modes but do not provide a fast enough signal to be used for safety functions. The less accurate prompt-responding type detectors, on the other hand, must be intermittently or continuously calibrated to assure an accurate signal. Generally, therefore, the prompt detectors have been used outside of the reactor to assure accessibility for calibration. This, however, inherently leads to a less accurate determination of the incore flux.

Alternately, in the prior art, where incore prompt detectors are used, such detectors are calibrated through the use of a moveable calibration detector system. The calibration detectors remain outside the core until called upon for calibration of the fixed incore detectors. The calibration detectors are then inserted by mechanical drive units into the reactor core, by way of calibration tubes of the fixed detector assemblies, and the calibration of the fixed incore detectors is accomplished. However, calibration of fixed detectors using a moveable calibration system has occurred at infrequent intervals because of wear-and-tear on the moveable system.

A further disadvantage of prior art detectors is that less power from a given amount of nuclear reactor fuel is obtained. An increase to optimum power density in a reactor core can be achieved only if the safety system can provide instantaneous protection by responding promptly to power changes in each fuel channel. Hence, it is important that such incore detectors as are used in the sensing of core power density be capable of prompt response to changes in power density as manifested by changes in local neutron fluxes. The output signals from such detectors must necessarily represent incore flux conditions that are instantaneously current rather than flux conditions that actually existed several seconds or more in the past.

SUMMARY OF THE INVENTION

In accordance with the present invention, as incore neutron flux detector assembly is provided, having a plurality of juxtapositioned pairs of prompt responding detectors and delayed responding neutron detectors. The more accurate delayed response detectors are utilized to provide a generally continuous calibration of the less accurate prompt responding detectors.

The composite incore detector assembly, generally has pairs of Rhodium-Hafnium detectors spaced axially along the active fuel height of the fuel assembly. The Hafnium detector is prompt-responding and in conjunction with an online computer system can provide three-dimensional power distributions on the order of once per second. Under steady-state conditions, the Hafnium signals can be easily calibrated using the power derived from the paired Rhodium signal.

The individual detectors of present invention have, as do certain prior art detectors, an emitter, an Inconel sheath, and an insulator interposed between the emitter and sheath. Further, the detectors have twin-leads to eliminate background noise and to increase accuracy.

The detector assembly is also provided with a calibration tube to provide capability for insertion of a moveable detector to obtain continuous axial traces or for intercalibration. The assembly may also contain an outlet thermo couple to measure temperature at the top of each instrumented fuel assembly. Further, to maintain the annularity of the detector assembly above those detectors whose emitters are positioned in the lower regions of the core, filler wires are provided between the outer sheath of the detector assembly and the calibration tube. In accordance with an object of the present invention, a neutron detector assembly provides a plurality of paired prompt-responding and delayed-response incore detectors for improving the measuring, calculating, and displaying of core power distributions. The output signals from a prompt response detector can be converted to core segment power and local power density values by calibrating the prompt-response detector signal to the signal from its paired delayed-response detector, which is at the same axial core height as the calibrated prompt-response detector.

It is another object of the present invention to provide reactor operators with more detailed and direct incore flux information to more quickly detect operating anomalies.

It is still another object of this invention to eliminate excess conservatisms that necessitate operating nuclear reactors far below their actual physical limits, thus increasing their availability.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWINGS

The invention will be described in connection with the accompanying drawings wherein:

FIG. 2 is a fragmentary view of the detector assembly of the present invention.

FIG. 3 is a transverse cross-sectional view of the detector assembly shown in FIG. 2 as taken along line 3—3 therein.

FIG. 4 is a longitudinal view, partly in section, of the detectors according to the preferred embodiment of the present invention.

FIG. 5 is a transverse cross-sectional view of the radiation detector shown in FIG. 4 as taken along line 5—5 therein.

FIG. 6 is a transverse cross-sectional view of the radiation detector shown in FIG. 4 as taken along line 6—6 therein.

DESCRIPTION OF INVENTION

Figure 1:
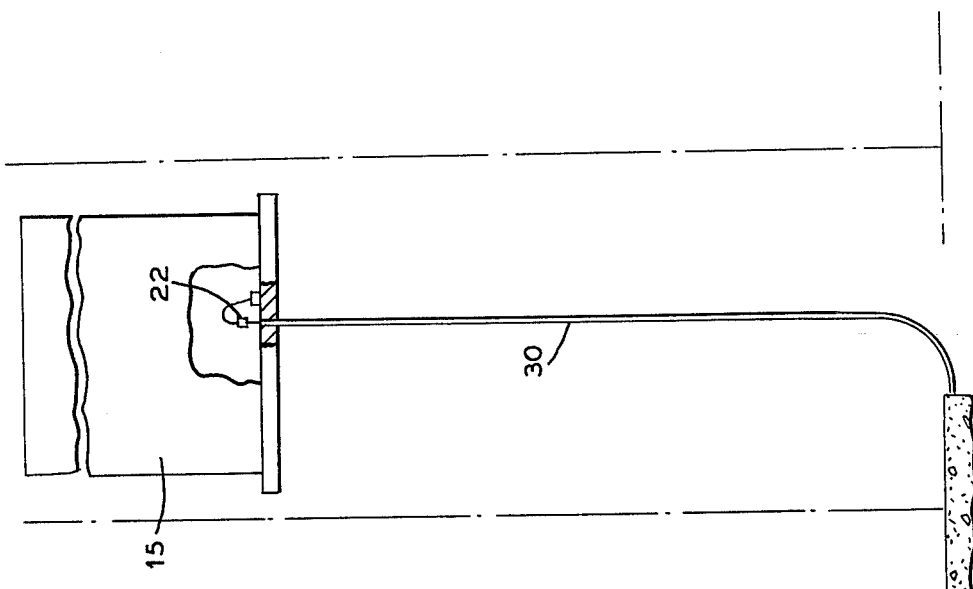
FIG. 1 is a view of a nuclear reactor embodying the present invention.

A critical measurement in the operation of nuclear reactors is that of incore neutron flux density. Heretofore such measurements is selected core locations have been made by delayed-response detectors which have an acceptable degree of accuracy but are slow responding to changes in flux density, having a time constant in the order of one or more minutes, thus prohibiting their use in a reactor control or safety channel, and limiting their use to providing a history of power distributions and variations during power operating modes.

Also available for incore neutron flux density measurement are prompt responding sensors having the necessary speed of response for use in a reactor control or safety channel but not having an acceptable degree of initial accuracy, and not possessing a predetermined functional relationship between neutron flux density and signal output. Thus, at present, their usefulness in monitoring reactor operation is limited. Typically, such prompt responding sensors have been located outside the reactor or, where located incore, must be calibrated by a moveable calibration detector system.

An incore monitoring system 10 as shown in FIG. 1 continuously measures core flux distribution during reactor power operation. The measurements are provided by detector assemblies 12 located at preselected core radial positions. Each detector assembly, as shown in FIGS. 2 and 3 contain a plurality of juxtapositioned pairs of local flux detectors 20 spaced around a calibration tube 14 and encased in an assembly oversheath 16. The oversheath is sealed at the core 18, for example by welding and the opposite end is sealed with a high-pressure closure assembly 22. The local flux detectors 20 are positioned to measure the flux at different core axial elevations.

Each detector assembly is inserted into the central instrumentation tube of a fuel assembly 17 through guide tubing 30. As shown in FIG. 1, the guide tubing extends from the bottom of the fuel assembly, through the reactor vessel bottom head 13, and terminates in the incore instrument removal tank 15. The guide tubing termination and the detector assembly high-pressure closure assembly form reactor coolant system seal just above the tank floor. The guide tubing is an extension of the reactor coolant system.

When the reactor system is depressurized, the detector assemblies can be inserted and withdrawn through the guide tubing for installation or replacement. During refueling operations, the detector assemblies are partially withdrawn to allow shuffling of the fuel. After refueling, the detector assemblies are re-inserted into the original core radial positions and the high-pressure seals are secured.

The composite incore detector assembly 12 consists of a plurality of pairs of detectors 20 spaced axially along the active fuel height of the core 19. One detector, a Hafnium detector 20' is prompt-responding and in conjunction with an on-line computer system can provide prompt three-dimensional power distributions. The slower-responding detector, a Rhodium detector 20", is paired with the Hafnium detector 20' to minimize required processing. Rhodium is self-powered, has only one mode of neutron activation ($Rh-103 + _0n^1 + Pd-104$) and depletes slowly enough so that a depletion correction can be made accurately. The Rhodium signal to power conversion is accomplished in an on-line computer (not shown). Under steady-state conditions, the Hafnium detector 20' signals can be easily calibrated using the power derived from the paired Rhodium detector signal.

Both detectors 20' and 20" are twin-lead 28 and 29 to eliminate background effects to increase accuracy. The lead wires 28 and 29, for example, are Inconel. Further FIG. 3 shows fillers 25, generally also of Inconel, positioned above the emitters toward the top of the core to maintain the annularity of the detector assembly.

FIG. 4 is an expanded partial sectional view of one of the detectors 20 of the assembly of detectors of FIG. 3. The detectors 20 can be seen to comprise an outer sheath 42 enclosing the emitter 44. The emitter (the neutron-sensitive element of the detector) is either Hafnium 20' (for prompt response) or Rhodium 20" (for delayed response.) However, in accordance with the present invention, the Hafnium 20' detector is paired with a Rhodium detector 20" and the paired detectors are spaced axially along the active fuel height. In the embodiment shown, having five paired detectors 20' and 20", each pair is at a different core height, and although each of the five paired detectors may detect different neutron flux, each individual paired detectors will essentially see or measure the same flux. Conductors or lead wires 28 and 29 are attached to the emitter 44, for example by crimping, and eliminate background noise. Both the lead wires 28 and 29 and the emitter 44 are surrounded by ceramic insulation 46, such as aluminum oxide, within the outer sheath 42. Incoming neutrons can pass easily through the outer sheath 42 and the insulation 46 and are absorbed by the emitter 44.

FIGS. 5 and 6 show the detector 20 in more detailed section.

From the foregoing it should be apparent that the objects of the invention have been carried out. Accordingly a detector assembly is provided in which prompt and delayed response self-powered detectors have been placed in the assembly in pairs with the prompt detector of the pair being continuously calibrated from the delayed detector to measure core power distribution axially along the active fuel height.

It will be understood that the above description of the present invention is susceptible to various modifications, changes and adaptations, and the same are intended to be comprehended within the meaning and range of equivalents of the appended claims.

We claim:

1. An apparatus for detecting and measuring nuclear flux density existing within a nuclear reactor, the apparatus comprising a plurality of pairs of detectors, each of said pairs comprises a prompt response detector having an emitter composed of hafnium and further comprises a delayed response detector, and both detectors of said pair are positioned within a nuclear reactor and juxtapositioned to sense the same neutron flux field so that the delayed response detector of said pairs may provide a continuous calibration signal to the corresponding prompt responding detector of said pairs.

2. An apparatus according to claim 1 wherein said delayed response detector has an emitter which is made of rhodium.

3. An apparatus according to claim 2 wherein each detector of said pair further has a sheath and an insulator, and said insulator is interposed between said sheath and said respective emitter.

4. An apparatus according to claim 1 wherein said delayed response detector has an emitter, each detector of said pair further has a sheath and an insulator, and said insulator is interposed between said sheath and said respective emitter.

* * * * *